(12) United States Patent
Pan et al.

(10) Patent No.: US 12,531,329 B2
(45) Date of Patent: Jan. 20, 2026

(54) VEHICLE SUNROOF AND VEHICLE

(71) Applicant: FUYAO GLASS INDUSTRY GROUP CO., LTD., Fujian (CN)

(72) Inventors: Chengwei Pan, Fujian (CN); Jianjian Lin, Fujian (CN); Tao Ban, Fujian (CN); Xiaqun Yu, Fujian (CN); Jiansen Zheng, Fujian (CN)

(73) Assignee: FUYAO GLASS INDUSTRY GROUP CO., LTD., Fujian (CN)

( * ) Notice: Subject to any disclaimer, the term of this patent is extended or adjusted under 35 U.S.C. 154(b) by 299 days.

(21) Appl. No.: 18/375,020

(22) Filed: Sep. 29, 2023

(65) Prior Publication Data
US 2024/0030593 A1   Jan. 25, 2024

Related U.S. Application Data

(63) Continuation of application No. PCT/CN2022/080179, filed on Mar. 10, 2022.

(30) Foreign Application Priority Data

Apr. 12, 2021   (CN) .......................... 202110391818.0

(51) Int. Cl.
*H01Q 1/32*  (2006.01)
*B60J 7/043*  (2006.01)
*B60R 16/023*  (2006.01)

(52) U.S. Cl.
CPC ............ *H01Q 1/3275* (2013.01); *B60J 7/043* (2013.01); *B60R 16/0231* (2013.01)

(58) Field of Classification Search
CPC ..... B60J 7/043; B60J 7/00; B60J 10/90; B60J 7/04; B60J 7/192; B60J 10/21;
(Continued)

(56) References Cited

U.S. PATENT DOCUMENTS

| 2012/0098715 | A1 | 4/2012 | Dai |
| 2015/0102625 | A1* | 4/2015 | Weicker ............... H01Q 1/3275 296/90 |
| 2020/0058988 | A1 | 2/2020 | Elshaar |

FOREIGN PATENT DOCUMENTS

| CN | 107615584 A | 1/2018 |
| CN | 108945109 A | 12/2018 |

(Continued)

OTHER PUBLICATIONS

The first office action issued in corresponding CN application No. 202110391818.0 dated Nov. 1, 2024.
(Continued)

*Primary Examiner* — Wei (Victor) Y Chan
(74) *Attorney, Agent, or Firm* — Scully, Scott, Murphy & Presser, P.C.

(57) ABSTRACT

A vehicle sunroof (100) and a vehicle (1000) are provided. The vehicle sunroof (100) includes a sunroof glass sheet (10) and an antenna assembly (20). The sunroof glass sheet (10) includes a light-transmitting portion (11) and an opaque masking portion (12) surrounding the light-transmitting portion (11). The light-transmitting portion (11) is used for allowing light to pass through. The opaque masking portion (12) is connected to a vehicle body and opposite to a ceiling (200), and the antenna assembly (20) is arranged between the opaque masking portion (12) and the ceiling (200). By arranging the antenna assembly (20) between the opaque masking portion (12) of the sunroof glass sheet (10) and the ceiling (200). The antenna assembly (20) will neither affect the exterior design of the vehicle nor increase the wind resistance of the vehicle.

17 Claims, 9 Drawing Sheets

A-A

B-B (58) Field of Classification Search
CPC ... B60J 10/22; B60J 10/32; B60J 10/80; B60J 10/82; B60J 3/0208; B60J 3/0213; B60J 3/022; H01Q 19/17; H01Q 21/08; H01Q 21/30; H01Q 25/007; H01Q 7/00; H01Q 9/0407
See application file for complete search history.

(56) References Cited

FOREIGN PATENT DOCUMENTS

| | | | |
|---|---|---|---|
| CN | 110086494 A | 8/2019 | |
| CN | 211519408 U | 9/2020 | |
| CN | 111987407 A | 11/2020 | |
| CN | 112514159 A | 3/2021 | |
| CN | 112542676 A | 3/2021 | |
| CN | 112909498 A | 6/2021 | |
| DE | 19637794 A1 | 3/1998 | |
| DE | 19824414 A1 | 12/1999 | |
| DE | 102004055175 A1 | 5/2006 | |
| DE | 102005035427 A1 | 2/2007 | |
| DE | 102016003757 A1 * | 9/2017 | ........... H01Q 1/3275 |
| DE | 102016219167 A1 * | 4/2018 | ............. H01Q 1/325 |
| DE | 102016220238 A1 * | 4/2018 | ............. H01Q 21/28 |
| DE | 102020007651 A1 | 2/2021 | |
| EP | 4293820 A1 * | 12/2023 | ............... H01Q 1/22 |
| JP | 2007158956 A | 6/2007 | |

OTHER PUBLICATIONS

International Search Report dated May 9, 2022 issued in PCT/CN2022/080179.
Extended European search report dated Aug. 22, 2024 received in European Patent Application No. 22787299.1.

* cited by examiner

VEHICLE SUNROOF AND VEHICLE

CROSS-REFERENCE TO RELATED APPLICATION(S)

This application is a continuation of International Patent Application No. PCT/CN2022/080179, filed Mar. 10, 2022, which claims priority to Chinese Patent Application No. 202110391818.0, filed Apr. 12, 2021, the disclosures of which are hereby incorporated by reference in their entireties.

TECHNICAL FIELD

The disclosure relates to the field of vehicle antenna, and in particular, to a vehicle sunroof and a vehicle.

BACKGROUND

The integration of antennas is becoming increasingly high with more and more antennas on vehicles. One of the typical form is a shark fin antenna. A shark fin antenna can be integrated with multiple antennas and installed on the top of the vehicle. It may also be made into an antenna box and installed inside a dashboard.

However, an external antenna (for example, the shark fin antenna mentioned above) tends to increase the wind resistance of the vehicle, which is not conducive to reducing the energy consumption of the vehicle. It may also affect the exterior design of the vehicle and increase wind noise. Also, considering the interference of the external environment, the design of the external antenna structure is relatively complex and the cost is relatively high, and the risk of antenna failure cannot be completely avoided (for example, it is difficult to ensure isolation among multiple antennas in a small space). A built-in antenna (for example, an antenna box inside a dashboard mentioned above) is susceptible to interference from other communication devices, especially in the case where the vehicle has a glass sheet adhered with insulated metal reflective films in subsequent use of the vehicle, the performance of the built-in antenna will decrease to ¼ of that of the built-in antenna in a case where the vehicle has a normal glass sheet, or even become completely ineffective. In addition, the increasing use of pre-coated glass in high-end vehicles, which provides better effect than film coatings, and exacerbates the impact on communication, causing poor reliability of the antenna box inside the dashboard.

SUMMARY

The purpose of the disclosure is to provide a vehicle sunroof and a vehicle, to avoid the defects brought by the external and internal forms mentioned above.

To achieve the purpose of the disclosure, technical solutions are provided by the disclosure as follows.

In a first aspect of the disclosure, a vehicle sunroof is provided. The vehicle sunroof includes a sunroof glass sheet and an antenna assembly. The sunroof glass sheet includes a light-transmitting portion and an opaque masking portion surrounding the light-transmitting portion. The light-transmitting portion is used for allowing light to pass through, the opaque masking portion is connected to a vehicle body and opposite to a ceiling, and the antenna assembly is arranged between the opaque masking portion and the ceiling. By arranging the antenna assembly between the opaque masking portion and the ceiling, the antenna assembly will neither affect the exterior design of the vehicle nor increase the wind resistance of the vehicle. As the sunroof isolates the antenna assembly and the external environment, the external environment may be taken out of consideration when designing the antenna assembly, which leads to simpler structure and lower costs. Meanwhile, there is a sufficient distance between the antenna assembly and other communication devices inside the vehicle (especially inside the dashboard), so that the antenna assembly is less susceptible to interference from the other communication devices and has strong stability.

In an implementation, the vehicle sunroof also includes a vehicle-mounted communication box, the antenna assembly is arranged on the opaque masking portion and is electrically connected to the vehicle-mounted communication box, and the vehicle-mounted communication box is used for communicating with a vehicle control system. By arranging the antenna assembly on the opaque masking portion, the antenna assembly and the sunroof may be assembled together before being integrated to the vehicle body and the ceiling, which helps to simplify the assembly of the whole vehicle. Moreover, arranging the antenna assembly on the opaque masking portion will not affect the interior of the vehicle. Also, since the antenna assembly is electrically connected to the vehicle-mounted communication box, the vehicle may interact with the external environment through the vehicle-mounted communication box and the antenna assembly.

In an implementation, the vehicle-mounted communication box and the antenna assembly are adjacently arranged at the same side of the opaque masking portion. By arranging the vehicle-mounted communication box and the antenna assembly adjacently at the same side of the opaque masking portion, the distance between the vehicle-mounted communication box and the antenna assembly as well as a radio frequency (RF) cable can be shortened, which helps to lower the costs and reduce signal attenuation.

In an implementation, the distance between the vehicle-mounted communication box and the antenna assembly ranges from 10 mm to 600 mm. By setting the distance within 600 mm, the distance between the vehicle-mounted communication box and the antenna assembly is relatively short, which is beneficial to further shortening the length of the RF cable. By setting the distance above 10 mm, the vehicle-mounted communication box and the antenna assembly can be avoided from interfering with each other when assembling the vehicle-mounted communication box and the antenna assembly.

In an implementation, the opaque masking portion has a protrusion extending into the interior of the light-transmitting portion, at least one of the vehicle-mounted communication box or the antenna assembly is arranged on the protrusion. It can be understood that, if the vehicle is compact in structure or at least one of the antenna assembly or the vehicle-mounted communication box is large in size, the space between the sunroof and the ceiling of normal design cannot accommodate at least one of the antenna assembly or the vehicle-mounted communication box. By extending the opaque masking portion into the light-transmitting portion to form a protrusion, at least one of the antenna assembly or the vehicle-mounted communication box is arranged on the protrusion, thus there is a sufficient space for mounting at least one of the antenna assembly or the vehicle-mounted communication box without affecting the appearance.

In an implementation, the antenna assembly includes a navigation antenna, the light-transmitting portion has a centerline, and the distance between the navigation antenna and the centerline is less than 70 cm. By arranging the navigation antenna at a position within a deviation of 70 cm (preferably within 50 cm) relative to the centerline of the light-transmitting portion, and the navigation antenna is located at the middle of the vehicle, thus the vehicle control system may obtain the accurate real-time position of the vehicle through the navigation antenna, which is beneficial to improving the user experience.

In an implementation, the vehicle sunroof also includes a sunshade arranged on the ceiling, the sunshade is configured to extend relative to the light-transmitting portion to cover the light-transmitting portion and is configured to retract relative to the light-transmitting portion to expose the light-transmitting portion, and the antenna assembly is spaced apart from the sunshade by a distance. By setting the sunshade, the sunshade may selectively block the external light and improve the user experience. Also, there is a distance between the sunshade and the antenna assembly, which can effectively reduce the risk of interference between the antenna assembly and the sunshade.

In an implementation, the distance between the antenna assembly and the sunshade is greater than or equal to 3 mm. By keeping the distance between the antenna assembly and the sunshade greater than or equal to 3 mm, the sunshade may operate normally without interfering with the antenna assembly.

In an implementation, the vehicle sunroof also includes a sheet metal member arranged on the ceiling and connected to the opaque masking portion, and the vehicle-mounted communication box is arranged on the sheet metal member. By arranging the vehicle-mounted communication box on the sheet metal member, the design optimizes space utilization and may be applied to situations where there is limited space between the ceiling and the sunroof, which is beneficial to adapting the antenna assembly and the vehicle-mounted communication box to various vehicle models.

In an implementation, the sheet metal member is provided with a first snap-fitting portion, the vehicle-mounted communication box is provided with a second snap-fitting portion, and the second snap-fitting portion is snapped into the first snap-fitting portion to fix the vehicle-mounted communication box to the sheet metal member. By arranging the first snap-fitting portion on the sheet metal member and arranging the second snap-fitting portion on the vehicle-mounted communication box, it facilitates a fixing between the vehicle-mounted communication box and the sheet metal member through snap-fitting, which is convenient and beneficial for simplifying the assembly process and reducing the difficulty of assembly and disassembly.

In an implementation, the vehicle sunroof also includes a first mounting portion and a second mounting portion. The first mounting portion is fixed to the sunroof glass sheet, at least one of the antenna assembly or the vehicle-mounted communication box defines a mounting hole, the second mounting portion extends through the mounting hole and is fixed to the first mounting portion, or the first mounting portion extends through the mounting hole and is fixed to the second mounting portion. By fixing the first mounting portion to the opaque masking portion, and by fixing the first mounting portion and the second mounting portion together, the antenna assembly or the vehicle-mounted communication box is arranged on the opaque masking portion, which is simple in structure and convenient. The antenna assembly and the vehicle-mounted communication box will be invisible in appearance, which is beneficial to simplifying the assembly process, reducing the difficulty of assembly and disassembly, and improving the aesthetic effect.

In an implementation, the first mounting portion is integrally formed with the opaque masking portion. By forming the first mounting portion integrally with the opaque masking portion, the first mounting portion and the opaque masking portion may be produced through integrated injection modeling, further simplifying the manufacturing and assembly processes.

In an implementation, part or all of the first mounting portion is integrally formed with the light-transmitting portion. By forming part or all of the first mounting portion integrally with the light-transmitting portion, part or all of the first mounting portion and the light-transmitting portion may be produced through integrated injection modeling, further simplifying the manufacturing and assembly processes.

In an implementation, the sunroof glass sheet is provided with a coating, the coating defines a communication window at a position opposite to the antenna assembly, and the antenna assembly is configured to transmit/receive signals through the communication window. It is to be understood that, since the antenna assembly is arranged on and in close contact with the sunroof glass sheet, the communication requirements of the antenna assembly may be met by opening only a small communication window at the position corresponding to the coating, which makes the antenna assembly more reliable. Also, the above setting does not affect the appearance and may apply environment-friendly coating material.

In a second aspect of the disclosure, a vehicle is provided. The vehicle includes a main control device, a ceiling, a vehicle body, and the vehicle sunroof of any one of implementations of the first aspect. The main control device and the ceiling are arranged inside the vehicle body, the vehicle sunroof is arranged on the vehicle body and opposite to the ceiling, and the antenna assembly of the vehicle sunroof is electrically connected to the main control device. Since the vehicle sunroof is simple in structure and low in costs, applying the vehicle sunroof provided in the disclosure to the vehicle helps to lower the manufacturing costs of the whole vehicle. In addition, since the antenna assembly of the vehicle sunroof is arranged between the opaque masking portion and the ceiling, the appearance design and the wind resistance of the vehicle will not be affected, and the antenna assembly is not easy to be interfered and more reliable, which is beneficial to the interactive communication between the vehicle and the external environment.

BRIEF DESCRIPTION OF THE DRAWINGS

In order to describe technical solutions in implementations of the disclosure more clearly, the following will give a brief introduction to accompanying drawings required for describing the implementations. Apparently, the accompanying drawings hereinafter described merely illustrate some implementations of the disclosure. Based on the accompanying drawings, those of ordinary skills in the art can also obtain other drawings without creative effort.

REFERENCE SIGNS

10—sunroof glass sheet; 11—light-transmitting portion; 12—opaque masking portion; 101—coating; 1011—communication window; 1201—front end; 1202—rear end; 121—protrusion;
20—antenna assembly; 21—RF cable; 201—mounting hole;
30—vehicle-mounted communication box; 31—multi-stranded wire; 32—second snap-fitting portion;
40—sunshade;
51—first mounting portion; 511—support; 512—nut portion; 52—second mounting portion; 53—adhesive;
60—sheet metal member; 61—first snap-fitting portion;
90—centerline;
100—vehicle sunroof; 200—ceiling; 2001—light-transmitting hole; 300—main control device; 400—vehicle body; 1000—vehicle.

DETAILED DESCRIPTION

The following will describe technical solutions of implementations of the disclosure clearly and completely with reference to the accompanying drawings in implementations of the disclosure. Apparently, implementations described herein are merely some implementations, rather than all implementations, of the disclosure. Based on the implementations of the disclosure, all other implementations obtained by those of ordinary skill in the art without creative effort shall fall within the protection scope of the disclosure.

Figure 1:
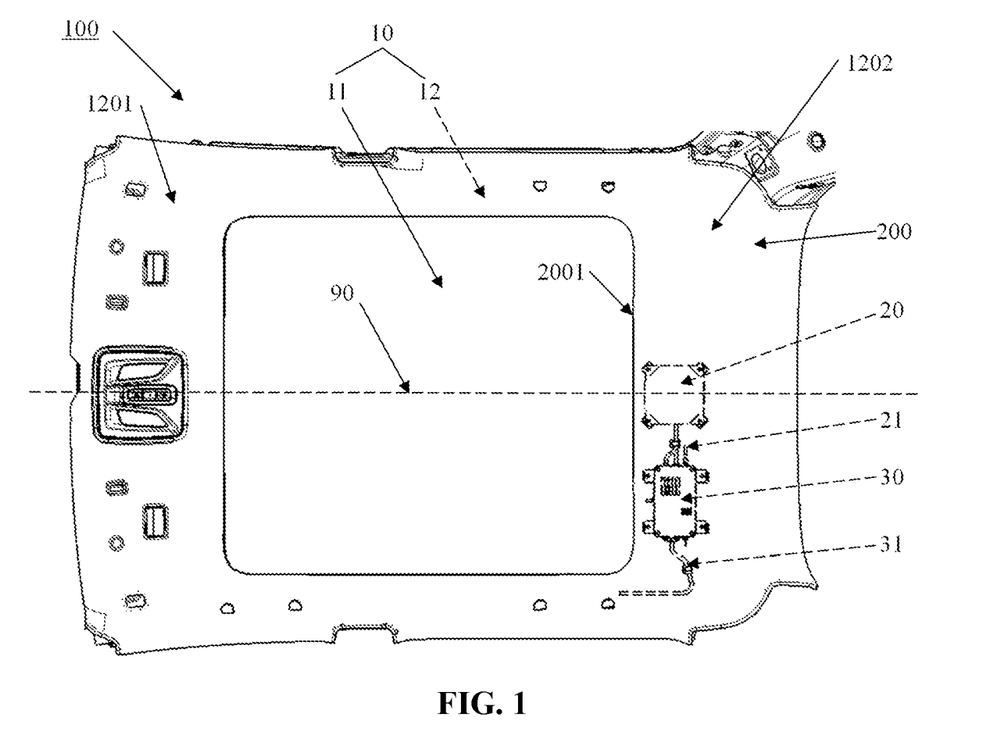
FIG. 1 is a schematic structural diagram of a vehicle sunroof and a ceiling provided in implementations of the disclosure.

Reference is made to FIG. 1, which is a schematic structural diagram of a vehicle sunroof 100 and a ceiling 200 provided in implementations of the disclosure (viewed from the inside to the outside of the vehicle). The implementations of the present disclosure provide a vehicle sunroof 100. The vehicle sunroof 100 includes a sunroof glass sheet 10 and an antenna assembly 20. The sunroof glass sheet 10 includes a light-transmitting portion 11 and an opaque masking portion 12 surrounding the light-transmitting portion 11. The opaque masking portion 12 is connected to a vehicle body and opposite to the ceiling 200. The antenna assembly 20 is arranged between the opaque masking portion 12 and the ceiling 200.

Specifically, the sunroof glass sheet 10 may be either single-layer glass sheet or double-layer glass sheet. The ceiling 200 defines a light-transmitting hole 2001. The light-transmitting portion 11 covers the light-transmitting hole 2001. The light-transmitting portion 11 of the sunroof glass sheet 10 has the same shape as the light-transmitting hole 2001. In the implementations, the shape of the light-transmitting portion 11 and the light-transmitting hole 2001 are rounded rectangle.

The opaque masking portion 12 of the sunroof glass sheet 10 is formed through ceramic sintering technology. The opaque masking portion 12 is mainly used to prevent the visibility of internal structures of the vehicle (such as adhesive bonding, sheet metal, etc.) from the outside, and to enhance the structural strength of the edges of sunroof glass sheet 10.

The antenna assembly may be arranged either on the opaque masking portion 12 or the ceiling 200. In the implementations, the antenna assembly 20 is arranged on the opaque masking portion 12. In other implementations, the overall strength of the ceiling 200 may be enhanced by setting a strengthening plate on one surface of the ceiling 200 facing the sunroof glass sheet 10, and then the antenna assembly 20 is arranged on the strengthening plate.

In the implementations, the antenna assembly 20 includes two vehicle-to-everything (V2X) antennas, four 5$^{th}$ generation (5G) antennas, and one global navigation satellite system (GNSS) antenna. The antenna assembly 20 may also include one Bluetooth® antenna, one Wi-Fi antenna, one amplitude modulated (AM) antenna, multiple (frequency modulated) FM antennas, etc. The GNSS antenna refers to the multi-frequency navigation (Beidou, global positioning system (GPS), GLONASS, GALILEO) antenna.

It is to be understood that the external antenna in the related art is exposed to the environment. In order to resist the interference of the environment, the external antenna needs to have higher strength and sealing performance, which significantly increases the complexity of the external antenna structure. Even with enhanced strength and sealing performance, the external antenna still has failure risks of narrow space, poor antenna performance, low isolation, etc., which leads to high costs and low reliability. As for the built-in antenna inside the dashboard, signal transceiving of the built-in antenna is easily interfered by other communication modules since the built-in antenna is close to other communication modules. In addition, the built-in antenna may be shielded by a coated glass sheet or post-coating, resulting in signal loss and other problems.

By arranging the antenna assembly 20 between the opaque masking portion 12 and the ceiling 200 of the sunroof glass sheet 10, the antenna assembly 20 will neither affect the exterior design of the vehicle nor increase the wind resistance of the vehicle. As the sunroof glass sheet 10 isolates the antenna assembly 20 and the external environment, the external environment may be taken out of consideration when designing the antenna assembly 20, which leads to simpler structure and lower costs. Meanwhile, there is a sufficient distance between the antenna assembly 20 and other communication devices inside the vehicle, so that the antenna assembly 20 is less susceptible to interference from the other communication devices and has strong stability.

In an implementation, reference is further made to FIG. 1. The vehicle sunroof 100 also includes a vehicle-mounted communication box 30 (T-box). The antenna assembly 20 is arranged on the opaque masking portion 12 and is electrically connected to the vehicle-mounted communication box 30. The vehicle-mounted communication box is used for communication with the main control of the vehicle. Specifically, the vehicle-mounted communication box 30 is located between the opaque masking portion 12 and the ceiling 200, and the vehicle-mounted communication box 30 may be arranged either on the opaque masking portion 12 or the ceiling 200. The vehicle-mounted communication box 30 is electrically connected to the antenna assembly 20 through the RF cable 21, and is electrically connected to the main control device through multi-stranded wire 31. This connection allows the main control to interact with the external environment, so that the main control can implement radio broadcasts receiving, 5G communication, V2X communication, high-precision positioning services, etc. By arranging the antenna assembly 20 on the opaque masking portion 12, the antenna assembly 20 and the sunroof glass sheet 10 may be assembled together before being integrated to the vehicle body and the ceiling 200, which helps to simplify the assembly of the whole vehicle. Moreover, arranging the antenna assembly 20 on the opaque masking portion 12 will not affect the interior of the vehicle. Also, since the antenna assembly 20 is electrically connected to the vehicle-mounted communication box 30, the vehicle may interact with the external environment through the vehicle-mounted communication box 30 and the antenna assembly 20.

Figure 2:
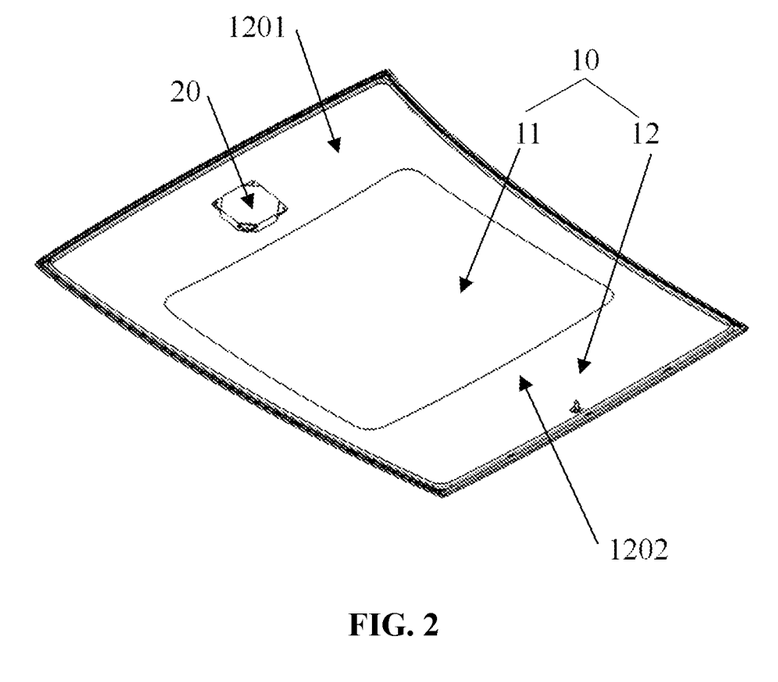
FIG. 2 is a schematic structural diagram of a sunroof glass sheet and an antenna assembly provided in an implementation of the disclosure.
Figure 3:
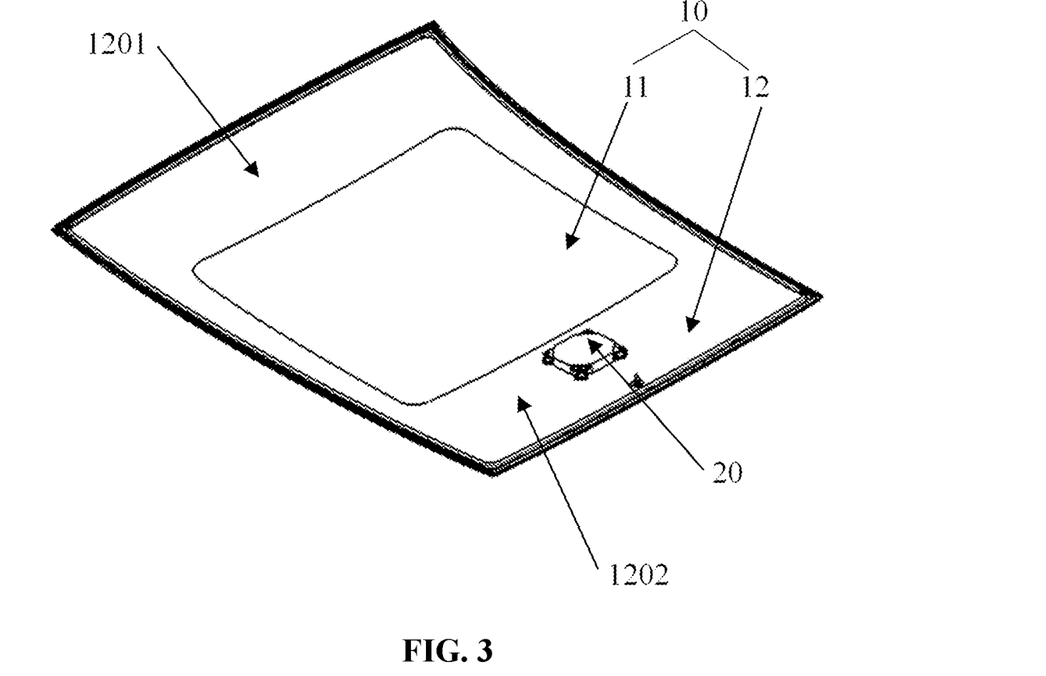
FIG. 3 is a schematic structural diagram of a sunroof glass sheet and an antenna assembly provided in another implementation of the disclosure.

Reference is made to FIG. 2 and FIG. 3. FIG. 2 is a schematic structural diagram of the sunroof glass sheet 10 and the antenna assembly 20 provided in an implementation of the disclosure. FIG. 3 is a schematic structural diagram of the sunroof glass sheet 10 and the antenna assembly 20 provided in another implementation of the disclosure. In the implementations, the opaque masking portion 12 includes a front end 1201 and a rear end 1202 facing away from the front end 1201. The front end 1201 is one side corresponding to a front windshield of the vehicle, and the rear end 1202 is the other side corresponding to a rear windshield of the vehicle. The antenna assembly 20 is arranged on the front end 1201 or the rear end 1202.

In an implementation, reference is made to FIG. 1. The vehicle-mounted communication box 30 and the antenna assembly 20 are arranged adjacently on the same side of the opaque masking portion 12. It is to be understood that, since the costs of the RF cable 21 between the vehicle-mounted communication box and the antenna assembly 20 is relatively high, too long RF cable 21 will lead to increased costs. Moreover, signals will attenuate during transmitting through the RF cable 21, and a higher frequency leads to a greater attenuation. The current intelligent network communication is developing towards higher and higher frequencies or even millimeter waves, and thus a too long RF cable 21 will cause severe signal attenuation.

In an implementation, reference is made to FIG. 1. The distance between the vehicle-mounted communication box 30 and the antenna assembly 20 ranges from 10 mm to 600 mm. By setting the distance within 600 mm, the distance between the vehicle-mounted communication box 30 and the antenna assembly 20 is relatively short, which is beneficial to further shortening the length of the RF cable. By setting the distance above 10 mm, the vehicle-mounted communication box and the antenna assembly can be avoided from interfering with each other when assembling the vehicle-mounted communication box 30 and the antenna assembly 20. Optimally, the distance between the vehicle-mounted communication box 30 and the antenna assembly 20 is within 50 mm, so that the length of the RF cable 21 can be further shortened.

In other implementations, the vehicle-mounted communication box 30 and the antenna assembly 20 may be assembled together, that is, the distance between the vehicle-mounted communication box 30 and the antenna assembly 20 is zero. In this way, the components of the vehicle-mounted communication box 30 and the components of the antenna assembly 20 are integrally formed in the same housing, and then the housing is installed on the opaque masking portion 12. Also, the vehicle-mounted communication box 30 and the antenna assembly 20, that are assembled together, may have a part going beyond the light-transmitting portion.

Figure 4:
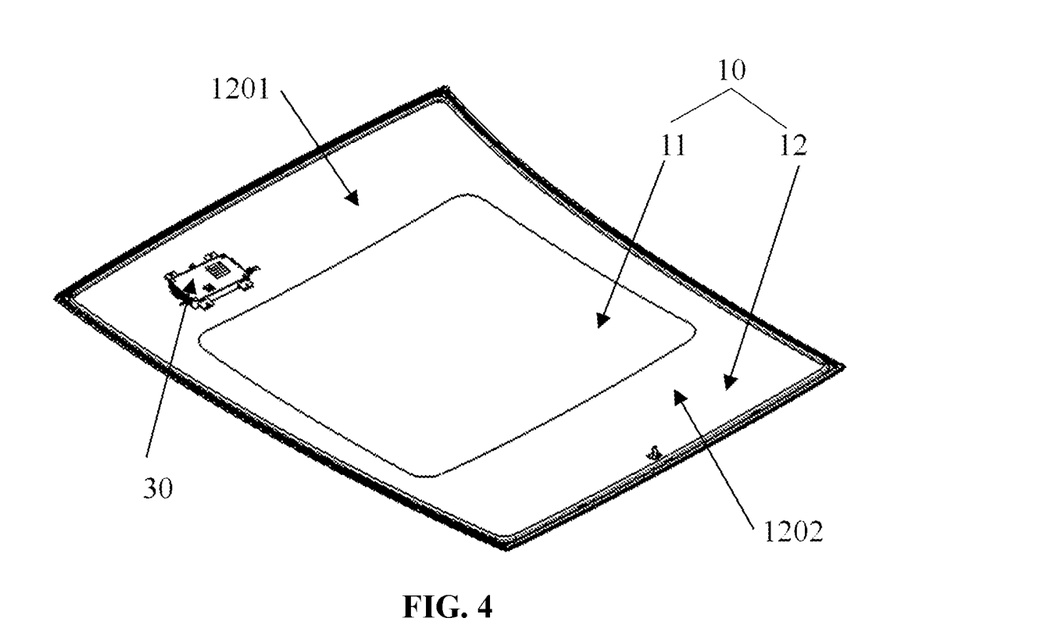
FIG. 4 is a schematic structural diagram of a sunroof glass sheet and a vehicle-mounted communication box provided in an implementation of the disclosure.
Figure 5:
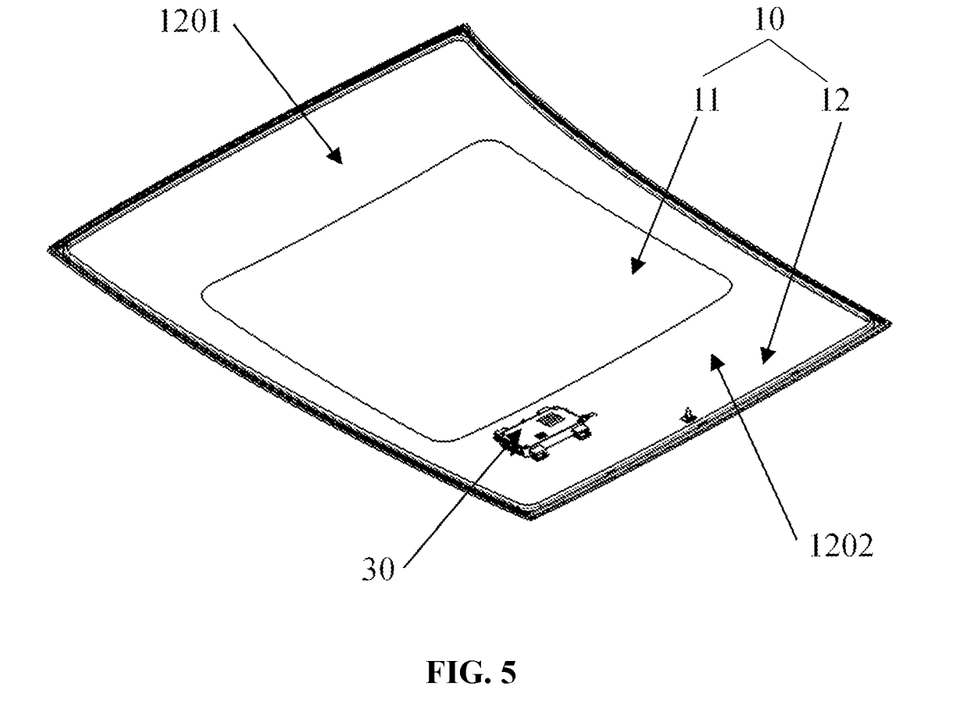
FIG. 5 is a schematic structural diagram of a sunroof glass sheet and a vehicle-mounted communication box provided in another implementation of the disclosure.

Reference is made to FIG. 4 and FIG. 5. FIG. 4 is a schematic structural diagram of a sunroof glass sheet 10 and a vehicle-mounted communication box 30 provided in an implementation of the disclosure. FIG. 5 is a schematic structural diagram of a sunroof glass sheet 10 and a vehicle-mounted communication box 30 provided in another implementation of the disclosure. In the implementations, the vehicle-mounted communication box 30 is arranged on the front end 1201 or the rear end 1202 of the opaque masking portion 12.

Reference is made to FIG. 1. Optimally, the vehicle-mounted communication box 30 and the antenna assembly 20 are arranged together on the front end 1201 or the rear end 1202, to shorten the distance between the vehicle-mounted communication box 30 and the antenna assembly 20.

Figure 6:
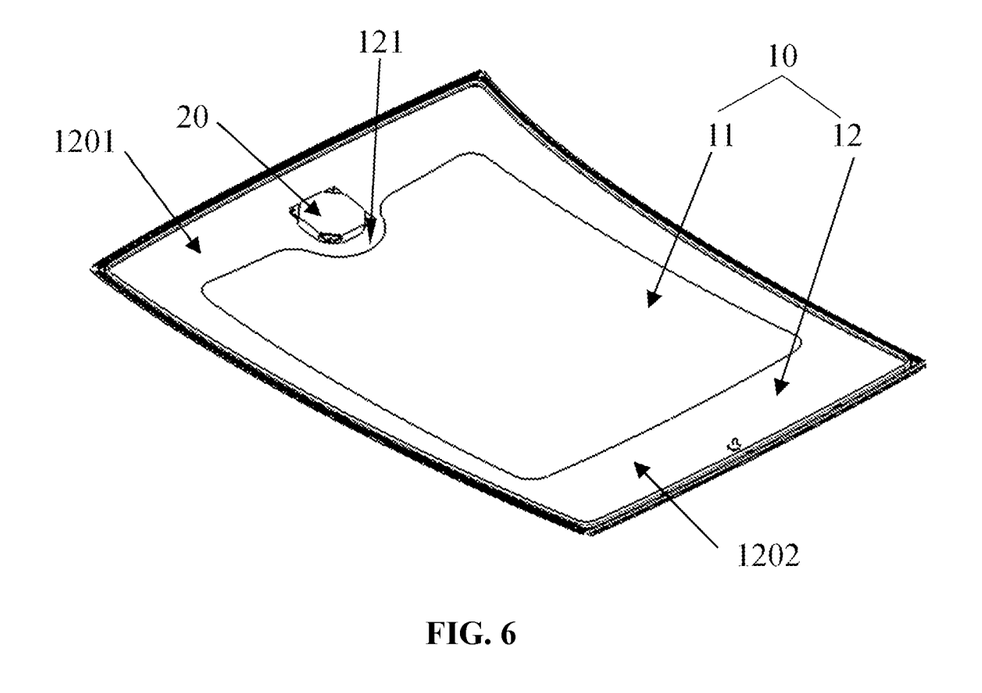
FIG. 6 is a schematic structural diagram of a sunroof glass sheet and an antenna assembly provided in another implementation of the disclosure.

In an implementation, reference is made to FIG. 1 and FIG. 6. FIG. 6 is a schematic structural diagram of a sunroof glass sheet 10 and an antenna assembly 20 provided in another implementation of the disclosure. The opaque masking portion 12 has a protrusion 121 extending into the interior of the light-transmitting portion 11, at least one of the vehicle-mounted communication box or the antenna assembly 20 is arranged on the protrusion 121. It can be understood that, if the vehicle is compact in structure (for example, more and more vehicles adopt a sunroof without a sunshade) or at least one of the antenna assembly 20 or the vehicle-mounted communication box 30 is large in size, the space between the sunroof glass sheet 10 and the ceiling 200 of normal design cannot accommodate at least one of the antenna assembly 20 or the vehicle-mounted communication box 39. By extending the opaque masking portion into the light-transmitting portion to form a protrusion, at least one of the antenna assembly 20 or the vehicle-mounted communication box 30 is arranged on the protrusion 121, thus there is a sufficient space for mounting at least one of the antenna assembly or the vehicle-mounted communication box without affecting the appearance.

Figure 11:
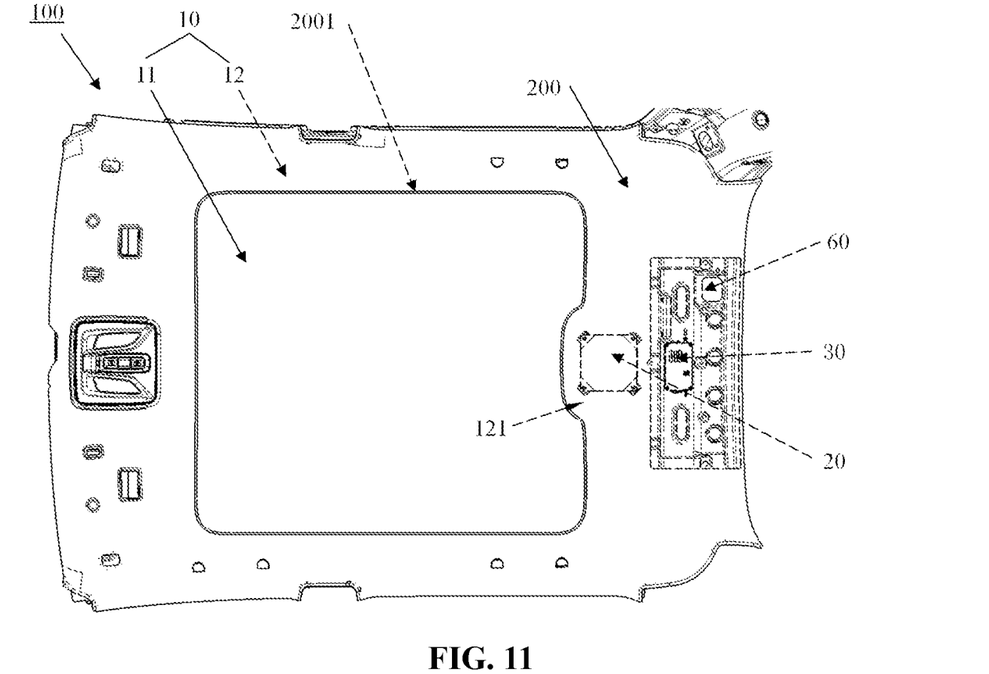
FIG. 11 is a schematic structural diagram of a vehicle sunroof and a ceiling provided in another implementation of the disclosure.

In the implementations, reference is made to FIG. 6 and FIG. 11. The protrusion 121 is arranged on the front end 1201 of the opaque masking portion. The shape of a light-transmitting hole 2001 corresponds to the shape of the light-transmitting portion 11, both shapes are rounded rectangles with inner-concave front sides. Part of the antenna assembly 20 is arranged on the protrusion 121. The vehicle-mounted communication box 30 may be arranged on other position of the opaque masking portion 12, or other members around the sunroof glass sheet 10.

Figure 7:
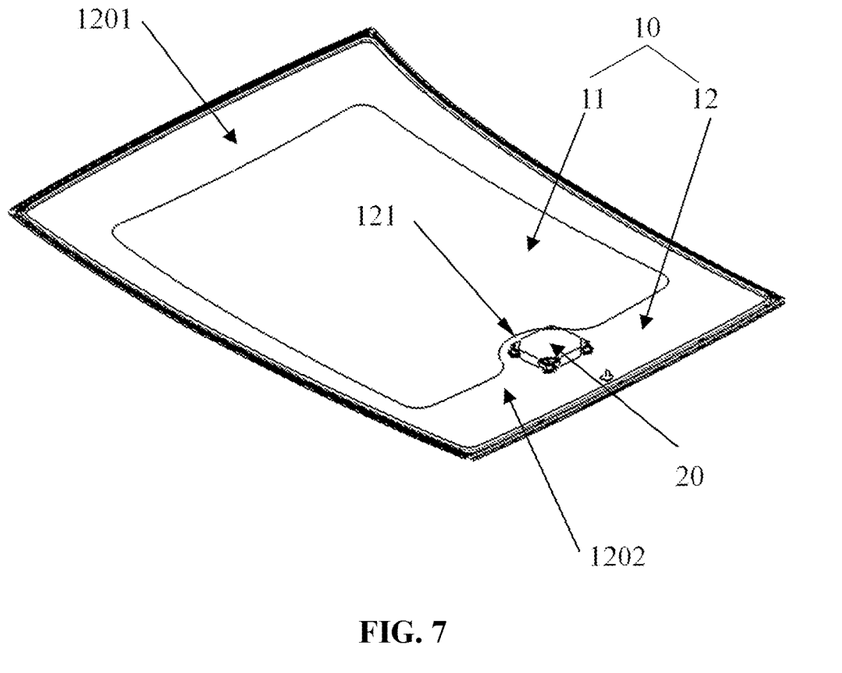
FIG. 7 is a schematic structural diagram of a sunroof glass sheet and an antenna assembly provided in another implementation of the disclosure.
Figure 10:
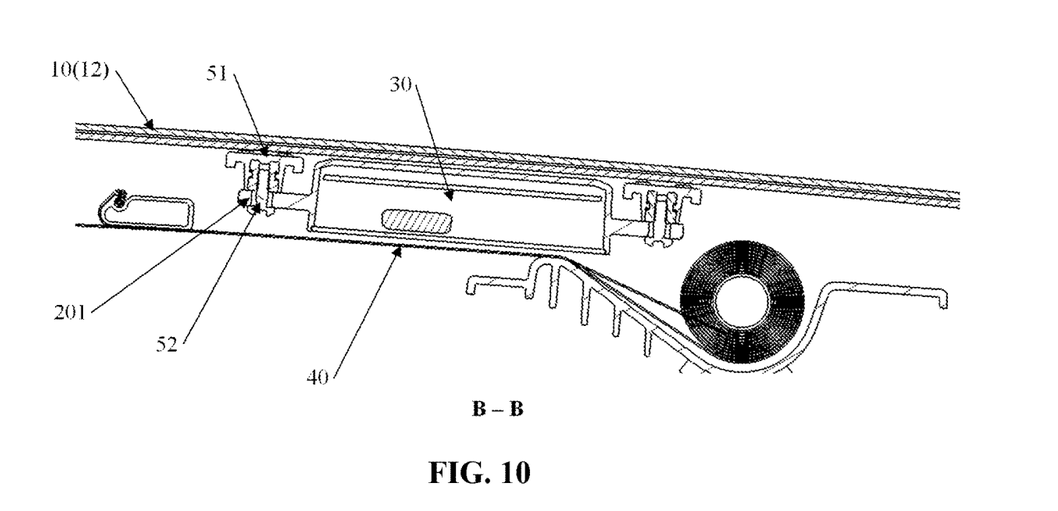
FIG. 10 is a cross-sectional schematic structural diagram of the vehicle sunroof in FIG. 8, taken along line B-B.

In another implementation, reference is made to FIG. 7 and FIG. 10. FIG. 7 is a schematic structural diagram of a sunroof glass sheet 10 and an antenna assembly 20 provided in another implementation of the disclosure. The protrusion 121 is arranged on the rear end 1202 of the opaque masking portion 12. The shape of the light-transmitting hole 2001 corresponds to the shape of the light-transmitting portion 11, both shapes are rounded rectangles with inner-concave rear sides. Part of the antenna assembly 20 is arranged on the protrusion 121. It is to be understood that, the protrusion 121 may be arranged near the inner edges of the opaque masking portion 12, and the shape of the protrusion is not limited to a rounded rectangle, and may also be an arc, a polygon, or other shapes.

In other implementations, the vehicle-mounted communication box 30 may be arranged independently on the protrusion 121, or arranged together with the antenna assembly 20 on the protrusion 121. At least one of the antenna assembly 20 or the vehicle-mounted communication box 30 may be arranged on the first protrusion 121. Alternatively, in the case where the first protrusion 121 is provided, at least one of the vehicle-mounted communication box 30 or the antenna assembly 20 may be arranged at a position adjacent to the opaque masking portion 12 and the first protrusion 121.

In an implementation, reference is made to FIG. 1. The antenna assembly 20 includes a navigation antenna (not illustrated). The light-transmitting portion 11 has a centerline 90, and the distance between the navigation antenna and the centerline 90 is within 70 cm. Specifically, the centerline 90 of the light-transmitting portion 11 extends from the front end 1201 to the rear end 1202. Optimally, the navigation antenna is located at the centerline 90, which means the distance between the navigation antenna and the centerline 90 is zero. By arranging the navigation antenna at the centerline of the light-transmitting portion 11, and the navigation antenna is located at the middle of the vehicle, thus the vehicle control system may obtain the accurate real-time position of the vehicle through the navigation antenna, which is beneficial to improving the user experience.

Figure 8:
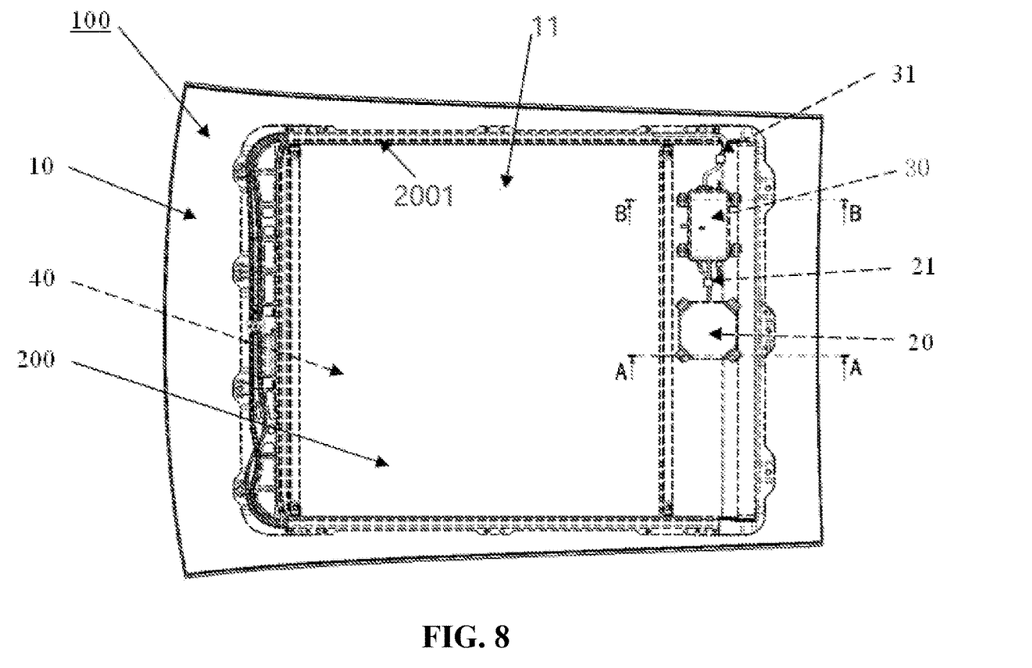
FIG. 8 is a schematic structural diagram of a vehicle sunroof and a ceiling provided in another implementation of the disclosure.
Figure 9:
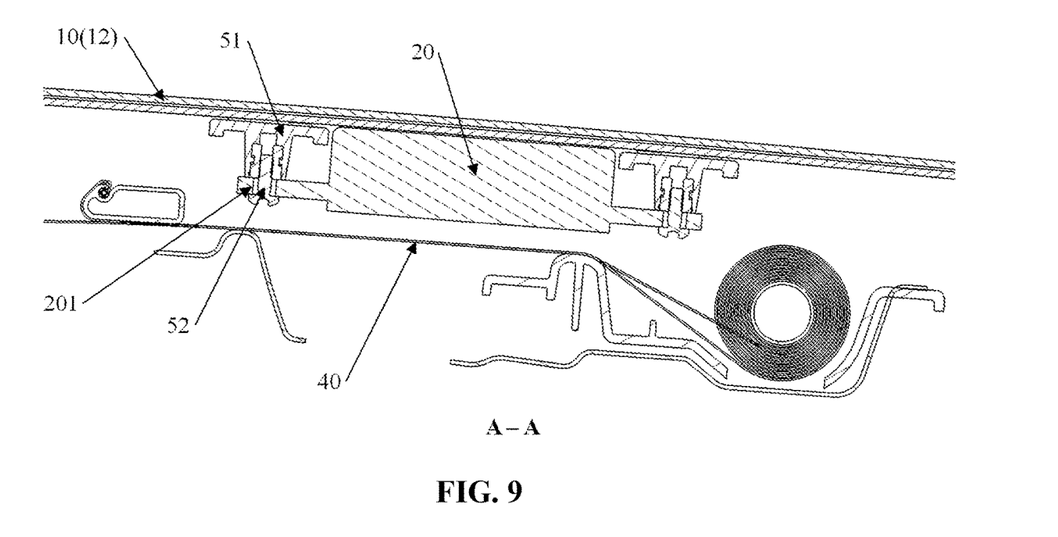
FIG. 9 is a cross-sectional schematic structural diagram of the vehicle sunroof in FIG. 8, taken along line A-A.

In an implementation, reference is made to FIG. 8 and FIG. 9. FIG. 8 is a schematic structural diagram of a vehicle sunroof 100 and a ceiling 200 provided in another implementation of the disclosure. FIG. 9 is a cross-sectional schematic structural diagram of the vehicle sunroof 100 in FIG. 8, taken along line A-A. The vehicle sunroof 100 also includes a sunshade 40, and the sunshade 40 is arranged on the ceiling 200. The sunshade 40 is configured to extend relative to the light-transmitting portion 11 to cover the light-transmitting portion 11 (i.e., the light-transmitting hole 2001) and is configured to retract relative to the light-transmitting portion 11 to expose the light-transmitting portion 11 (i.e., the light-transmitting hole 2001), and the antenna assembly 20 is spaced apart from the sunshade 40 by a distance. By setting the sunshade 40, the sunshade 40 may selectively block the external light and improve the user experience. Also, there is a distance between the sunshade 40 and the antenna assembly 20, which can effectively reduce the risk of interference between the antenna assembly 20 and the sunshade 40.

In an implementation, reference is made to FIG. 9. The distance is greater than or equal to 3 mm. By keeping the distance between the antenna assembly 20 and the sunshade 40 greater than or equal to 3 mm, the sunshade 40 may operate normally without interfering with the antenna assembly Specially, the optimal distance is greater than or equal to 8 mm. A sufficient spacing may further reduce the risk of interference between the sunshade 40 and the antenna assembly 20.

Specifically, the distance may be 8 mm, 9 mm, 11 mm, 14 mm, 20 mm, etc., the optimal distance is less than 30 mm, which avoids excessive compression of the interior space of the vehicle.

In an implementation, reference is made to FIG. 10, which is a cross-sectional schematic structural diagram of the vehicle sunroof 100 in FIG. 8, taken along line B-B. The communication box of the vehicle in the implementations is also spaced apart from the sunshade 40 by a distance. In this way, the sunshade 40 may operate normally without interfering with the communication box of the vehicle.

Figure 12:
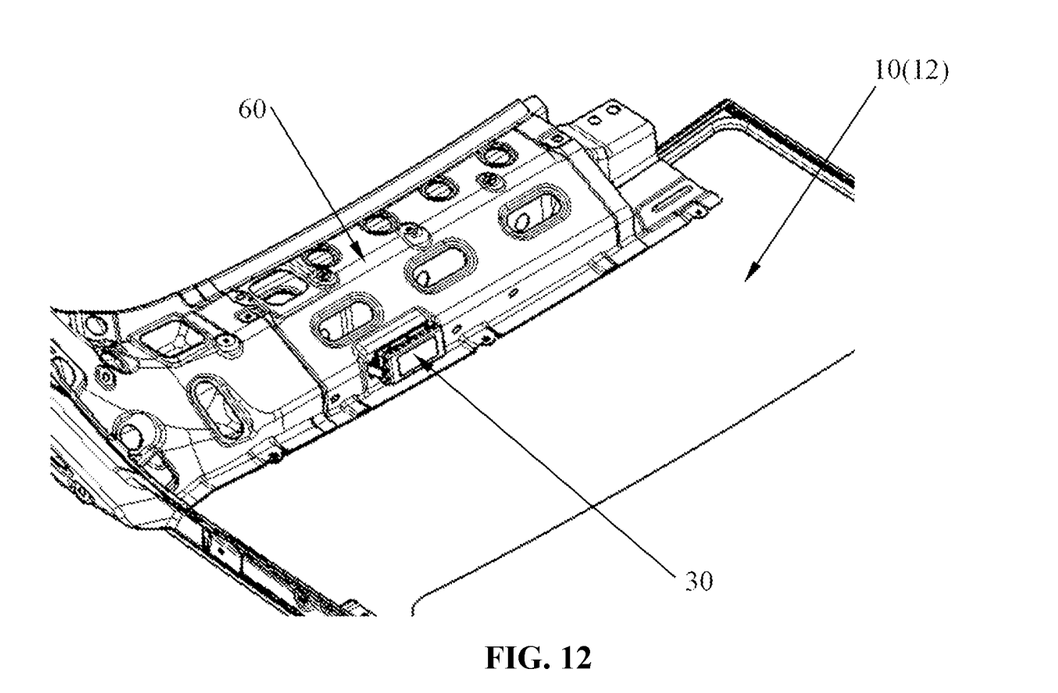
FIG. 12 is a schematic structural diagram of a sheet metal member, a vehicle-mounted communication box, and a sunroof glass sheet in FIG. 11.

In an implementation, reference is made to FIG. 11 and FIG. 12. FIG. 11 is a schematic structural diagram of a vehicle sunroof 100 and a ceiling 200 provided in another implementation of the disclosure. FIG. 12 is a schematic structural diagram of a sheet metal member 60, a vehicle-mounted communication box 30, and a sunroof glass sheet 10 in FIG. 11. The vehicle sunroof 100 also includes the sheet metal member 60 arranged on the ceiling 200 and connected to the opaque masking portion 12. The vehicle-mounted communication box 30 is arranged on the sheet metal member 60. By arranging the vehicle-mounted communication box 30 on the sheet metal member 60, the design optimizes space utilization and may be applied to situations where there is limited space between the ceiling 200 and the sunroof glass sheet 10, which is beneficial to adapting the antenna assembly 20 and the vehicle-mounted communication box 30 to various vehicle models.

In the implementations, part of the antenna assembly is arranged on the first protrusion 121. The sheet metal member 60 and the antenna assembly 20 are at the same side of the opaque masking portion 12 (the outer edge of the opaque masking portion 12 and the sheet metal member 60 may be, but are not limited to, adhered), and the sheet metal member 60 is adjacent to the antenna assembly 20. The vehicle-mounted communication box 30 is arranged on the sheet metal member 60 at a position close to the antenna assembly 20.

Figure 13:
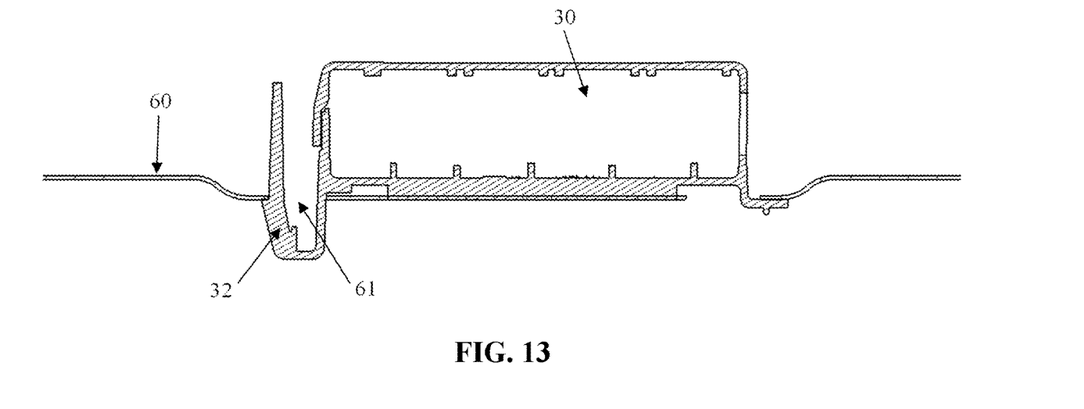
FIG. 13 is a schematic structural diagram of the sheet metal member and the vehicle-mounted communication box in FIG. 12.

In an implementation, reference is made to FIG. 13, which is a schematic structural diagram of the sheet metal member 60 and the vehicle-mounted communication box 30 in FIG. 12. The sheet metal member 60 is provided with a first snap-fitting portion 61, the vehicle-mounted communication box 30 is provided with a second snap-fitting portion 32. The second snap-fitting portion 32 is snapped into the first snap-fitting portion 61 to fix the vehicle-mounted communication box 30 to the sheet metal member 60. By arranging the first snap-fitting portion 61 on the sheet metal member 60 and arranging the second snap-fitting portion 32 on the vehicle-mounted communication box 30, it facilitates a fixing between the vehicle-mounted communication box 30 and the sheet metal member 60 through snap-fitting, which is convenient and beneficial for simplifying the assembly process and reducing the difficulty of assembly and disassembly.

In the implementations, each of two sides of the vehicle-mounted communication box is provided with the second snap-fitting portion 32, the sheet metal member 60 is provided with the first snap-fitting portions 61 at positions corresponding to the second snap-fitting portions 32. The first snap-fitting portion 61 is a through-hole, the second snap-fitting portion 32 is a snap, and the snap-fitting is completed by inserting the snap into the through-hole.

In other implementations, the first snap-fitting portion 61 may be a snap, and the second snap-fitting portion 32 may be a through-hole. The snap-fitting is completed by fitting the second snap-fitting portion 32 (i.e., the through-hole) into the first snap-fitting portion 61 (i.e., the snap).

Figure 14:
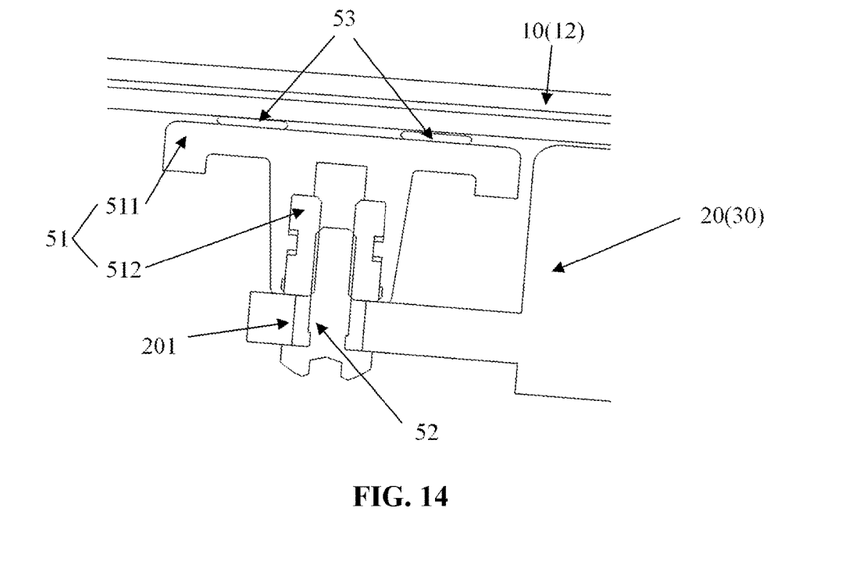
FIG. 14 is a schematic structural diagram of assembling of a sunroof glass sheet and one of a vehicle-mounted communication box or an antenna assembly provided in an implementation of the disclosure.

In an implementation, reference is made to FIG. 14, which is a schematic structural diagram of assembling of a sunroof glass sheet and one of a vehicle-mounted communication box 30 or an antenna assembly 20 provided in an implementation of the disclosure. The vehicle sunroof 100 also includes a first mounting portion 51 and a second mounting portion 52, and the first mounting portion 51 is fixed to the sunroof glass sheet 10. At least one of the antenna assembly 20 or the vehicle-mounted communication box 30 defines a mounting hole 201, the second mounting portion 52 extends through the mounting hole 201 and is fixed to the first mounting portion 51, or the first mounting portion 51 extends through the mounting hole 201 and is fixed to the second mounting portion 52. In this way, the structure is simple and convenient, and the antenna assembly 20 and the vehicle-mounted communication box 30 will be invisible in appearance, which is beneficial to simplifying the assembly process, reducing the difficulty of assembly and disassembly, and improving the aesthetic effect.

In the implementations, the first mounting portion 51 includes a support 511 and a nut portion 512, the nut portion 512 is embedded in and fixed to the support 511, the support 511 is fixed to the opaque masking portion 12 of the sunroof glass sheet 10 through an adhesive 53. The nut portion 512 has internal threads, and the second mounting portion 52 (i.e., a screw) has external threads, and the second mounting portion 52 extends through the mounting hole 201 from one side of the vehicle-mounted communication box 30 (or the antenna assembly 20) facing away from the first mounting portion 51, and is threaded to the nut portion 512, thereby fixing the vehicle-mounted communication box 30 (or the antenna assembly 20) to the opaque masking portion 12 of the sunroof glass sheet 10.

In other implementations, the support 511 may be integrally formed with the nut portion 512, for example, to form the first mounting portion 51 with internal threads through injection modeling. The support 511 may also be fixed to the light-transmitting portion through the adhesive 53.

Figure 15:
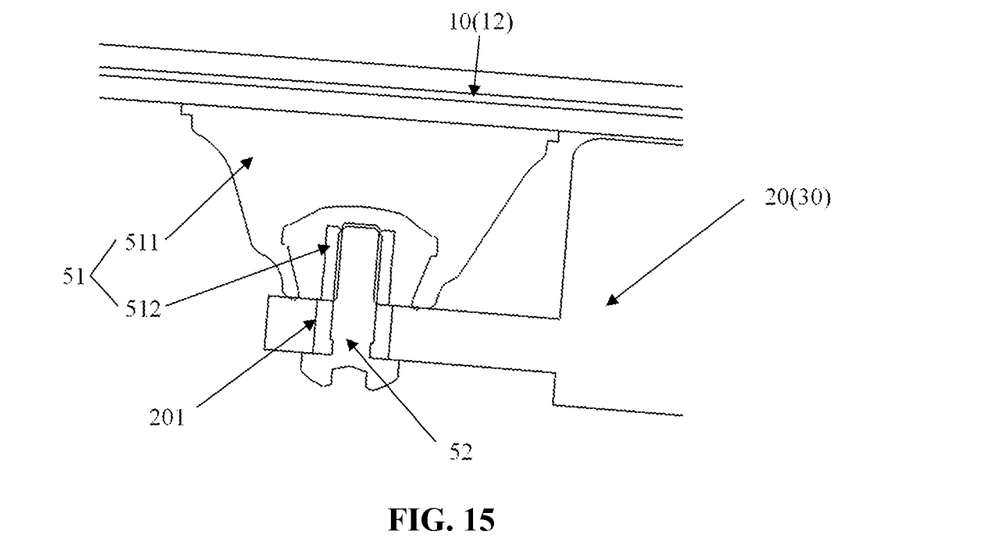
FIG. 15 is a schematic structural diagram of assembling of a sunroof glass sheet and one of a vehicle-mounted communication box or an antenna assembly provided in another implementation of the disclosure.

In an implementation, reference is made to FIG. 15, which is a schematic structural diagram of assembling of a sunroof glass sheet and one of a vehicle-mounted communication box 30 or an antenna assembly 20 provided in another implementation of the disclosure. The first mounting portion 51 is integrally formed with the opaque masking portion 12. Optimally, by forming the first mounting portion 51 integrally with the opaque masking portion 12, the first mounting portion 51 and the opaque masking portion 12 may be produced through integrated injection modeling, further simplifying the manufacturing and assembly processes.

In the implementation, the support 511 of the first mounting portion 51 is integrally formed with the sunroof glass sheet 10, and the nut portion 512 of the first mounting portion 51 is embedded in the support 511.

In other implementations, the support 511 and the nut portion 512 of the first mounting portion 51 may also be integrally formed with the sunroof glass sheet 10.

In the first mounting portion 51 in the above implementation, a screw portion (not illustrated) with external threads may also be used instead of the nut portion 512, and the second mounting portion 52 has internal threads. The screw portion extends through the mounting hole 201 and is threaded with the second mounting portion 52 to fix the vehicle-mounted communication box 30 (or the antenna assembly 20) to the opaque masking portion 12 of the sunroof glass sheet 10.

Figure 16:
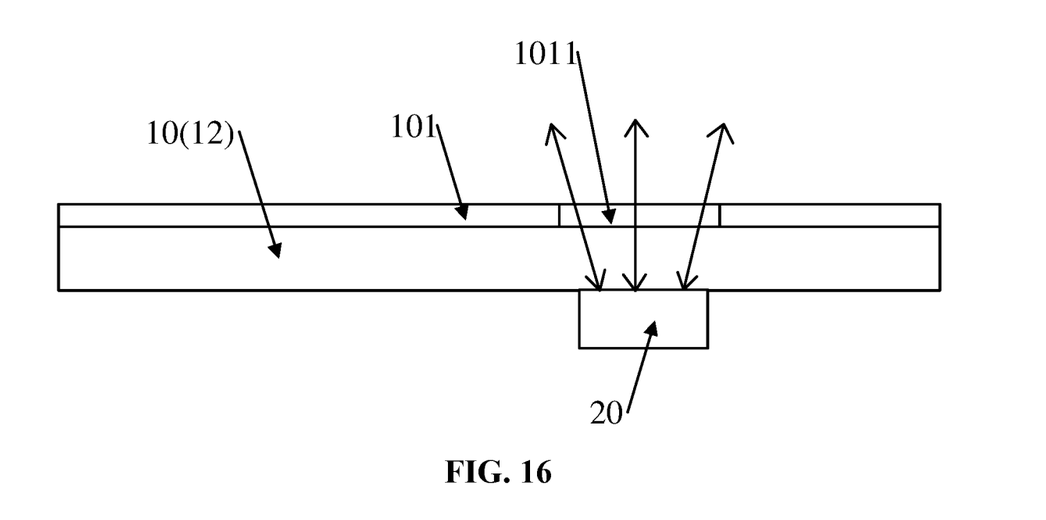
FIG. 16 is a schematic structural diagram of a sunroof glass sheet and an antenna assembly provided in an implementation of the disclosure.

In an implementation, reference is made to FIG. 16, which is a schematic structural diagram of a sunroof glass sheet 10 and an antenna assembly 20 provided in an implementation of the disclosure. The sunroof glass sheet 10 is provided with a coating 101, the coating 101 defines a communication window at a position opposite to the antenna assembly 20, and the antenna assembly 20 is configured to transmit/receive signals through the communication window.

In the implementations, the coating 101 is arranged on the sunroof glass sheet 10 and covers the whole surface of the sunroof glass sheet 10 facing the antenna assembly 20. A communication window 1011 is located at the opaque masking portion or the light-transmitting portion of the sunroof glass sheet 10 and opposite to the antenna assembly 20. Signals from the external environment (such as radio) may enter the antenna assembly 20 through the sunroof glass sheet 10 via the communication window 1011, and the signals emitted by the antenna assembly 20 may also reach the external environment through the sunroof glass sheet 10 via the communication window 1011, thus achieving the communication between the antenna assembly 20 and the external environment.

It is to be understood that, since the antenna assembly 20 is arranged on and in close contact with the opaque masking portion 12 (e.g. in the form of attaching or adhesive bonding), the communication requirements of the antenna assembly 20 may be met by opening only a small communication window 1011 at the position corresponding to the coating 101, which makes the antenna assembly 20 more reliable. Also, the above setting does not affect the appearance and may apply environment-friendly coating 101. If the antenna assembly 20 is not arranged on the opaque masking portion 12 or the light-transmitting portion 11, and the distance between the antenna assembly and the coating 101 is too large, then the size of the communication window 1011 required defined at the coating 101 is too large, which not only significantly affects the appearance, but also makes the coating removal difficult, thereby making it unfavorable for the application of the coating 101 of energy conservation and environmental protection to the sunroof glass sheet 10.

Figure 17:
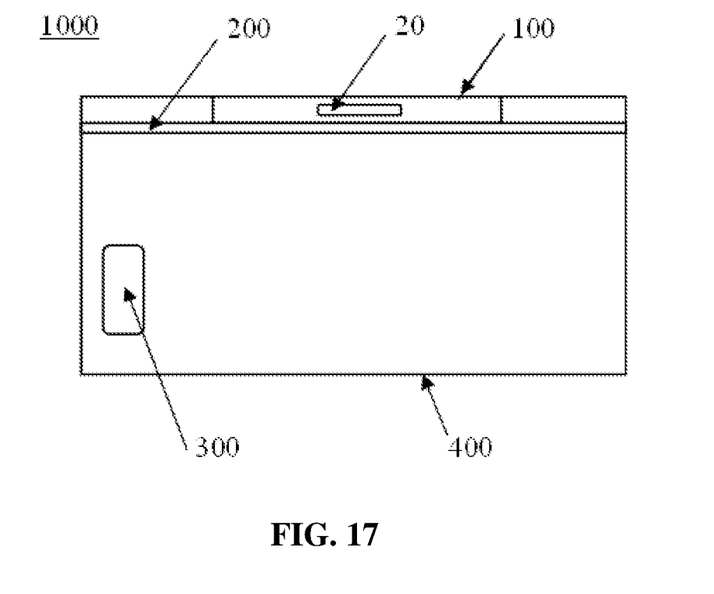
FIG. 17 is a schematic structural diagram of a vehicle provided in the implementation of the disclosure.

Reference is made to FIG. 17, which is a schematic structural diagram of a vehicle 1000 provided in the implementation of the disclosure. The implementation of the disclosure provides a vehicle 1000. The vehicle 1000 includes a vehicle sunroof 100, a ceiling 200, a main control device 300, and a vehicle body 400. The main control device 300 and the ceiling 200 are arranged inside the vehicle body 400, the vehicle sunroof 100 is arranged on the vehicle body 400 and opposite to the ceiling 200, and the antenna assembly 20 of the vehicle sunroof 100 is electrically connected to the main control device 300. Specifically, the antenna assembly 20 is electrically connected to the main control device 300 through the vehicle-mounted communication box 30. The main control device 300 may control a window switch, play a broadcast, display a navigation route, control an air conditioner, etc. Since the vehicle sunroof 100 is simple in structure and low in costs, applying the vehicle sunroof 100 provided in the disclosure to the vehicle 1000 helps to lower the manufacturing costs of the whole vehicle. In addition, since the antenna assembly 20 of the vehicle sunroof 100 is arranged between the opaque masking portion 12 and the ceiling 200, the appearance design and the wind resistance of the vehicle will not be affected, and the antenna assembly 20 is not easy to be interfered and more reliable, which is beneficial to the interactive communication between the vehicle and the external environment.

The above implementations are merely some implementations of the disclosure, and the above implementations cannot limit the scope of the disclosure. The ordinary skill in the field can understand all or part of the process that realizes the above implementations of the disclosure, and equivalent changes made in accordance with the claims of the disclosure still belong to the scope of the disclosure covered.

What is claimed is:

1. A vehicle sunroof, comprising a sunroof glass sheet and an antenna assembly, wherein the sunroof glass sheet comprises a light-transmitting portion and an opaque masking portion surrounding the light-transmitting portion, wherein the light-transmitting portion is used for allowing light to pass through, the opaque masking portion is connected to a vehicle body and opposite to a ceiling, and the antenna assembly is arranged between the opaque masking portion and the ceiling;
    the vehicle sunroof further comprises a vehicle-mounted communication box and a sheet metal member, wherein the antenna assembly is arranged on the opaque masking portion and is electrically connected to the vehicle-mounted communication box, the vehicle-mounted communication box is used for communicating with a vehicle control system, the sheet metal member is arranged on the ceiling and connected to the opaque masking portion, and the vehicle-mounted communication box is arranged on the sheet metal member.

2. The vehicle sunroof of claim 1, wherein the vehicle-mounted communication box and the antenna assembly are adjacently arranged at the same side of the opaque masking portion.

3. The vehicle sunroof of claim 2, wherein a distance between the vehicle-mounted communication box and the antenna assembly ranges from 10 mm to 600 mm.

4. The vehicle sunroof of claim 2, wherein the opaque masking portion has a protrusion extending into the interior of the light-transmitting portion, at least one of the vehicle-mounted communication box or the antenna assembly is arranged on the protrusion.

5. The vehicle sunroof of claim 1, wherein the antenna assembly comprises a navigation antenna, the light-transmitting portion has a centerline, and a distance between the navigation antenna and the centerline is less than 70 cm.

6. The vehicle sunroof of claim 1, wherein the vehicle sunroof further comprises a sunshade arranged on the ceiling, the sunshade is configured to extend relative to the light-transmitting portion to cover the light-transmitting portion and is configured to retract relative to the light-transmitting portion to expose the light-transmitting portion, and the antenna assembly is spaced apart from the sunshade by a distance.

7. The vehicle sunroof of claim 6, wherein the distance is greater than or equal to 3 mm.

8. The vehicle sunroof of claim 1, wherein the sheet metal member is provided with a first snap-fitting portion, the vehicle-mounted communication box is provided with a second snap-fitting portion, and the second snap-fitting portion is snapped into the first snap-fitting portion to fix the vehicle-mounted communication box to the sheet metal member.

9. The vehicle sunroof of claim 1, further comprising a first mounting portion and a second mounting portion, wherein the first mounting portion is fixed to the sunroof glass sheet, at least one of the antenna assembly or the vehicle-mounted communication box defines a mounting hole, the second mounting portion extends through the mounting hole and is fixed to the first mounting portion, or the first mounting portion extends through the mounting hole and is fixed to the second mounting portion.

10. The vehicle sunroof of claim 9, wherein the first mounting portion is integrally formed with the sunroof glass sheet.

11. The vehicle sunroof of claim 1, wherein the sunroof glass sheet is provided with a coating, the coating defines a communication window at a position opposite to the antenna assembly, and the antenna assembly is configured to transmit/receive signals through the communication window.

12. A vehicle, comprising a main control device, a ceiling, a vehicle body, and a vehicle sunroof, wherein the vehicle sunroof comprises a sunroof glass sheet and an antenna assembly, wherein the sunroof glass sheet comprises a light-transmitting portion and an opaque masking portion surrounding the light-transmitting portion, the light-transmitting portion is used for allowing light to pass through, the opaque masking portion is connected to a vehicle body and opposite to a ceiling, and the antenna assembly is arranged between the opaque masking portion and the ceiling;
    the main control device and the ceiling are arranged inside the vehicle body, the vehicle sunroof is arranged on the vehicle body and opposite to the ceiling, and the antenna assembly of the vehicle sunroof is electrically connected to the main control device; and
    the vehicle sunroof further comprises a vehicle-mounted communication box and a sheet metal member, wherein the antenna assembly is arranged on the opaque masking portion and is electrically connected to the vehicle-mounted communication box, the vehicle-mounted communication box is used for communicating with a vehicle control system, the sheet metal member is arranged on the ceiling and connected to the opaque masking portion, and the vehicle-mounted communication box is arranged on the sheet metal member.

13. The vehicle of claim 12, wherein the vehicle-mounted communication box and the antenna assembly are adjacently arranged at the same side of the opaque masking portion.

14. The vehicle of claim 13, wherein a distance between the vehicle-mounted communication box and the antenna assembly ranges from 10 mm to 600 mm.

15. The vehicle of claim 13, wherein the opaque masking portion has a protrusion extending into the interior of the light-transmitting portion, at least one of the vehicle-mounted communication box or the antenna assembly is arranged on the protrusion.

16. The vehicle of claim 12, wherein the antenna assembly comprises a navigation antenna, the light-transmitting portion has a centerline, and a distance between the navigation antenna and the centerline is less than 70 cm.

17. The vehicle of claim 12, wherein the vehicle sunroof further comprises a sunshade arranged on the ceiling, the sunshade is configured to extend relative to the light-transmitting portion to cover the light-transmitting portion and is configured to retract relative to the light-transmitting portion to expose the light-transmitting portion, and the antenna assembly is spaced apart from the sunshade by a distance.

* * * * *